(12) United States Patent
Zou et al.

(10) Patent No.: US 11,790,137 B2
(45) Date of Patent: Oct. 17, 2023

(54) METHOD FOR PARAMETER DESIGN AND NUMERICAL SIMULATION OF JET TRENCHER NOZZLE

(71) Applicant: DALIAN UNIVERSITY OF TECHNOLOGY, Liaoning (CN)

(72) Inventors: Li Zou, Liaoning (CN); Lizhi Tang, Tianjin (CN); Zhe Sun, Liaoning (CN); Yanshun Zhu, Tianjin (CN); Yuguo Pei, Liaoning (CN); Zhiqiang Wang, Tianjin (CN); Weitong Xu, Liaoning (CN); Guoqing Jin, Liaoning (CN); Zhen Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 458 days.

(21) Appl. No.: 17/059,008

(22) PCT Filed: Aug. 9, 2019

(86) PCT No.: PCT/CN2019/099882
§ 371 (c)(1),
(2) Date: Nov. 25, 2020

(87) PCT Pub. No.: WO2020/164233
PCT Pub. Date: Aug. 20, 2020

(65) Prior Publication Data
US 2021/0209275 A1    Jul. 8, 2021

(30) Foreign Application Priority Data
Feb. 11, 2019    (CN) .......................... 201910110150.0

(51) Int. Cl.
G06F 30/28    (2020.01)
G06F 30/17    (2020.01)
(Continued)

(52) U.S. Cl.
CPC .............. *G06F 30/28* (2020.01); *G06F 30/17* (2020.01); *G06F 2111/10* (2020.01); *G06F 2113/08* (2020.01)

(58) Field of Classification Search
CPC ...... G06F 30/28; G06F 30/17; G06F 2111/10; G06F 2113/08
See application file for complete search history.

(56) References Cited

FOREIGN PATENT DOCUMENTS

| CN | 102426094 A | 4/2012 |
|----|-------------|--------|
| CN | 103868454 A | 6/2014 |

(Continued)

OTHER PUBLICATIONS

Sjoerd Warringa, et al., "Modelling the Waterjet Cable Trenching Process on Sand Dunes," Conference Paper, pp. 1-19 (Apr. 2019) (Year: 2019).*

(Continued)

*Primary Examiner* — Steven W Crabb
(74) *Attorney, Agent, or Firm* — NKL Law; Allen Xue

(57) ABSTRACT

The present disclosure provides a parameter design and numerical simulation method for jet trencher nozzle, comprising the following steps: S1. designing parameters of nozzle; S2. selecting the parameters of nozzle; S3. establishing a geometric model; S4. setting boundary conditions and delineating grids; S5. performing numerical simulation using Flow-3D; and S6. performing results processing and analysis. According to the present invention, the whole process of nozzle flushing and ground breaking can be simulated, the size of the cross-section of the flushing trench is measured, and by analyzing the obtained result, the reasonability of nozzle radius parameter design can be verified, and a certain reference is provided for design of inclination angle parameters.

5 Claims, 5 Drawing Sheets

(51) Int. Cl.
*G06F 113/08* (2020.01)
*G06F 111/10* (2020.01)

(56) References Cited

FOREIGN PATENT DOCUMENTS

CN 105631110 A 6/2016
CN 109902363 A 6/2019

OTHER PUBLICATIONS

J-F. Vanden Berghe, et al., "Jet Induced Trenching Operations: Mechanisms Involved," OTC 19441 Offshore Technology Conference 2008 (Year: 2008).*

Gao, Wei; Parameter Optimization of Seabed Hydraulic Jet Trenching Machine; Master Degree Thesis of Dalian University of Technology; Dec. 18, 2008.

Yang, Geunyoung et al.; An Experimental Study of Slot Jet Impingement Cooling on Concave Surface: Effects of Nozzle Configuration and Curvature; International Journal of Heat and Mass Transfer 42 (1999) 2199-2209.

Wu, Qiang; Study on Nozzle Configuration and Nozzle Combination Used on Jet Trencher; China University of Petroleum Master's Theses; Nov. 30, 2011, pp. 11-45.

Dong, Yufei et al.; Study on Parameters Optimization and Numerical Simulation of Submarine Jet Trencher; Petroleum Engineering Construction; vol. 43, No. 2, Apr. 30, 2017, pp. 85-87 and 92.

Li, Junying et al.; Design and Optimization of Key Parameters for Nozzle of Jet Trencher; Petroleum Engineering Construction; vol. 44, No. 3, Jun. 30, 2018, pp. 27-30.

Li, J. H. et al.; Water Jetting Arm Optimal Design Consideration for a ROV Trencher; IEEE, Dec. 31, 2015, pp. 1-5.

Lin Lu et al.; Numerical Simulation of the Equilibrium Profile of Local Scour around Submarine Pipelines Based on Renormalized Group Turbulence Model; Ocean Engineering; vol. 32, No. 17-18, Jul. 11, 2005.

* cited by examiner

METHOD FOR PARAMETER DESIGN AND NUMERICAL SIMULATION OF JET TRENCHER NOZZLE

TECHNICAL FIELD

The present disclosure relates to a method for parameter design and numerical simulation of jet trencher nozzle according to jet flow pressure equation, belonging to the field of mechanical engineering.

BACKGROUND ART

With the continuous exploration and development of marine resources, submarine pipeline will become an important way to transport submarine resources. In order to protect the submarine pipeline from man-made and natural damage, it is necessary to dig trench and bury the pipeline. At present, the most widely used method of trench and burial is post-trenching method, in which the trencher rides on the submarine pipeline to dig trench after the submarine pipeline is sunk on the seabed, as the trencher moves forward, the pipeline automatically sinks to the bottom of the trench, and the sandy soil on both side of the trench and the suspended sediment naturally accumulate back into the trench under the action of flow and waves. Jet trencher is the trencher most used in the post-trenching method, which is to use the high-pressure water jet flow from the nozzle to flush the lower seabed of both sides of the submarine pipeline, to break the soil layer of the seabed or liquefy the soil, forming grooves under the pipeline. The jet trencher is designed with two symmetrical jet arms mounted on either side of the pipeline. A series of nozzles are installed on the jet arm. The design of nozzle parameter is one of the key techniques in the design of trencher, and plays a decisive influence in the shape of the flushing trench. Researchers at home and abroad have done a lot of research on the design and optimization of the nozzle parameter.

The research on the design and optimization of the jet trencher nozzle includes experimental simulation method and numerical simulation method. The experimental simulation method satisfies the actual physical conditions, and can monitor the jet flow parameters and the jet flow flushing process in a real way. For example, Yang Geunyoung used experimental method to obtain that the velocity attenuation of the jet flow in the axial direction is related to the molded lines of the runner inside the nozzle. At present, numerical simulation method, i.e. computational fluid dynamics (CFD) method, is widely used in the design of nozzle parameters and the interaction between the jet flow and soil mass, and has achieved great success with high calculation efficiency, fast calculation speed, and accurate result prediction. Such as Gao Wei studied nozzle on different contraction segment lengths, cylinder segment length, diffusion segment length, and contraction angle by numerical simulation; Wu Qiang analyzed the form and combination modes of the nozzle from two aspects of numerical values.

In the past, the research mainly focused on the parameters of form, length of each segment, and contraction angle of the nozzle, and no reasonable and universally applicable method was proposed for the design of the nozzle diameter. With more and more strict requirements on trench shape in actual seabed trench work, it is necessary to carry out accurate calculation simulation for the trench shape flushed by jet flow that meets actual requirements, and the parameter of inclined angle of the inclined nozzle has a very important influence on the actual trench shape. Therefore, a new design method combining with nozzle diameter and inclined angle will make nozzle parameter design and optimization more reasonable, more applicable and more widely used. Using numerical simulation to study the influence of inclined angle on the flushing trench shape will provide some reference value for the nozzle inclined angle design with different trench shape requirements.

SUMMARY OF THE INVENTION

According to the technical problems mentioned above, the present disclosure provides a method for parameter design and numerical simulation of jet trencher nozzle. The technical solutions of the present disclosure are as follows:

A method for parameter design and numerical simulation of jet trencher nozzle, including the following steps:

S1. designing parameters of nozzle

According to an effective pressure calculation equation of jet flow at a distance of x from the nozzle:

$$\overline{F} = \frac{pR^2}{0.0127x^2},$$

deriving a relation between a nozzle radius and an inclination angle $\beta$ when the effective pressures of jet flow of an inclined nozzle and a vertical nozzle are equal at the same vertical distance:

$$R_i = \frac{1}{\cos\beta}R_v,$$

wherein, R is a radius of the nozzle, p is outlet dynamic pressure of the nozzle, $R_v$ is a radius of the vertical nozzle, $R_i$ is a radius of the inclined nozzle;

S2. selecting parameters of the nozzle

According to the equation $$R_i = \frac{1}{\cos\beta}R_v$$

derived by step S1, taking the radius $R_v$ of the vertical nozzle as a fixed value, and selecting different inclination angles $\beta$ to obtain different radii $R_i$ of inclined nozzles;

S3. establishing a geometric model

According to the nozzle parameters selected in step S2, establishing a combination geometric model of the vertical nozzle and the inclined nozzle by Solidworks;

S4. setting boundary conditions and delineating grids

Importing the combination geometric model established in step S3 into Flow-3D software, dividing the computational domain into two blocks connected with each other from top to bottom, defining the boundary of the two blocks, and delineating grid on the computational domain and checking the quality of the grids;

S5. performing numerical simulation by using Flow-3D

Adding a sediment physical model and defining the sediment parameters, setting an initial condition and time steps of the computational domain, and calculating a physical timescale and a maximum number of iterations.

Solving numerical values in flow-3D; and

S6. performing results processing and analysis

Deriving a topographic surface file of Flow-3D calculation results in step S5, processing the topographic surface file by Matlab, to obtain and analyze the geometric parameters of the flushing trench profile.

In step S1, due to the outlets of the inclined nozzle and the vertical nozzle at the same vertical heights, the target distance $x_i$ of the inclined nozzle is $$\frac{1}{\cos\beta}$$

times or me strike distance $x_v$ of the vertical nozzle, that is $$x_i = \frac{1}{\cos\beta} x_v,$$

which is plugged into the jet flow effective pressure calculation equation; in order to use same outlet dynamic pressure to make the inclined nozzle and the vertical nozzle reach the same jet flow effective pressure at the same vertical distance, deriving an equation:

$$R_i = \frac{1}{\cos\beta} R_v.$$

In step 4, defining the boundaries around the upper block as $X_{Max}$, $X_{Min}$, $Y_{Max}$ and $Y_{Min}$, which are set as pressure outlet boundaries with a pressure value as 0, and setting $Z_{Max}$ of the upper block as a pressure inlet boundary with a pressure value as a nozzle inlet pressure;

due to $Z_{min}$ of the upper block is connected to $Z_{max}$ of the lower block, setting $Z_{min}$ of the upper block as a default boundary;

defining the four boundaries of the lower block as $X'_{Max}$, $X'_{Min}$, $Y'_{Max}$ and $Y'_{Min}$, which are set as wall boundaries, due to $Z'_{Min}$ of the lower block is sediment, also setting $Z'_{Min}$ as the wall boundary, and setting $Z'_{Max}$ of the lower block as a default boundary, which is connected with the $Z_{Min}$ boundary of the upper block; and increasing the density of grids of the nozzles in two blocks and the grids in three directions of the flushing area, setting grids of the remaining area sparsely, so as to control the grid quantity reasonably.

In step S5, calculating a sediment volume fraction by tracking a sediment concentration $C_s$ of the suspended sediment and a sediment concentration $C_p$ of the bed load using the sediment physical model; a total sediment volume fraction $\alpha_s$ is the total volume fraction of suspended sediment and bed load in the grid, with an equation:

$$\alpha_s = \frac{C_s + C_p}{\rho_s} = 1 - \alpha_f$$

wherein, $\alpha_f$ is a volume fraction of the fluid in a grid, $\rho_s$ is a sediment particle density, an expression for the volume fraction of the bed load is $\alpha_{s,p} = C_p/\rho_s$, an expression for the volume fraction of the suspended sediment is $\alpha_{s,s} = C_s/\rho_s$, a critical sediment volume fraction is $\alpha_{cr}$, and the total volume fraction $\alpha_s$ is smaller or equal to the critical sediment volume fraction $\alpha_{cr}$; the parameters need to be defined in the sediment physical model are: median particle size with the unit of m, sediment density with the unit of kg/m³, entrainment coefficient $\alpha_i$, bed load coefficient $\beta_i$, angle of repose with the unit of °, and critical sediment volume fraction; and using the RNGk-ε model, which is applicable to calculate local flushing caused by water flow, in the Flow-3D as a turbulence model:

$$\rho\frac{Dk}{Dt} = \frac{\partial}{\partial y}\left(\alpha_k \mu_{eff}\frac{\partial k}{\partial y}\right) + G_k + G_b - \rho\varepsilon - Y_M$$

$$\rho\frac{D\varepsilon}{Dt} = \frac{\partial}{\partial y}\left(\alpha_\varepsilon \mu_{eff}\frac{\partial \varepsilon}{\partial y}\right) + C_{1\varepsilon}\frac{\varepsilon}{k}(G_k + C_{3\varepsilon}G_b) - C_{2\varepsilon}\rho\frac{\varepsilon^2}{k} - R$$

wherein, $\rho$ is a fluid density, t is the time, k is a turbulent kinetic energy, $\varepsilon$ is a turbulent dissipation rate; $\alpha_k$ and $\alpha_\varepsilon$ are inverses of the turbulent Prandtl number; $\mu_{eff}$ and R are corrected parameters; $G_k$ and $G_b$ are respectively laminar velocity gradient and turbulent kinetic energy caused by buoyancy; $Y_M$ is turbulent expansion contribution of compressible fluid; $C_{1\varepsilon}$, $C_{2\varepsilon}$ and $C_{3\varepsilon}$ are empirical constants.

In step S6, deriving the topographic surface file of the Flow-3D calculation results in step S5, processing the topographic surface file by Matlab, obtaining the geometric parameters of the flushing trench profile and drawing the flushing trench profile;

verifying that the effective pressures acting on the sediment surface at the same vertical distance of the inclined nozzle and vertical nozzle are equal by analyzing the parameter of maximum trench depth; and summarizing the influence rule of nozzle angle size on the trench profile by analyzing the geometrical shape of the flushing trench profile.

The present disclosure can simulate the whole process of the nozzle flushing and breaking the soil and measure the size of the flushing trench profile, and the analysis of the obtained results can verify the reasonability of the parameter design of nozzle radius and provide a certain reference for the parameter design of the inclined angle.

Based on the above reasons, the present disclosure can be widely used in mechanical engineering and other fields.

BRIEF DESCRIPTION OF THE DRAWINGS

In order to more clearly illustrate the embodiments of the present disclosure or the technical solutions in the prior art, the drawings required in the description of the embodiments or the prior art will be briefly introduced below. Obviously, the drawings in the following descriptions are some embodiments of the present disclosure. For those of ordinary skilled in the art, other drawings can be obtained based on these drawings without inventive effort.

DETAILED DESCRIPTION OF THE PREFERRED EMBODIMENTS

To make the objectives, technical solutions and advantages of the present disclosure clearer, a clear and complete description in the embodiments of the present disclosure may be given herein after in combination with the accompany drawings in the embodiment of the present disclosure. Obviously, the described embodiments are parts of the embodiments of the present disclosure, but not all of them. Based on the embodiments in the present disclosure, all other embodiments obtained by those of ordinary skilled in the art without inventive effort are within the scope of the present disclosure.

Figure 1:
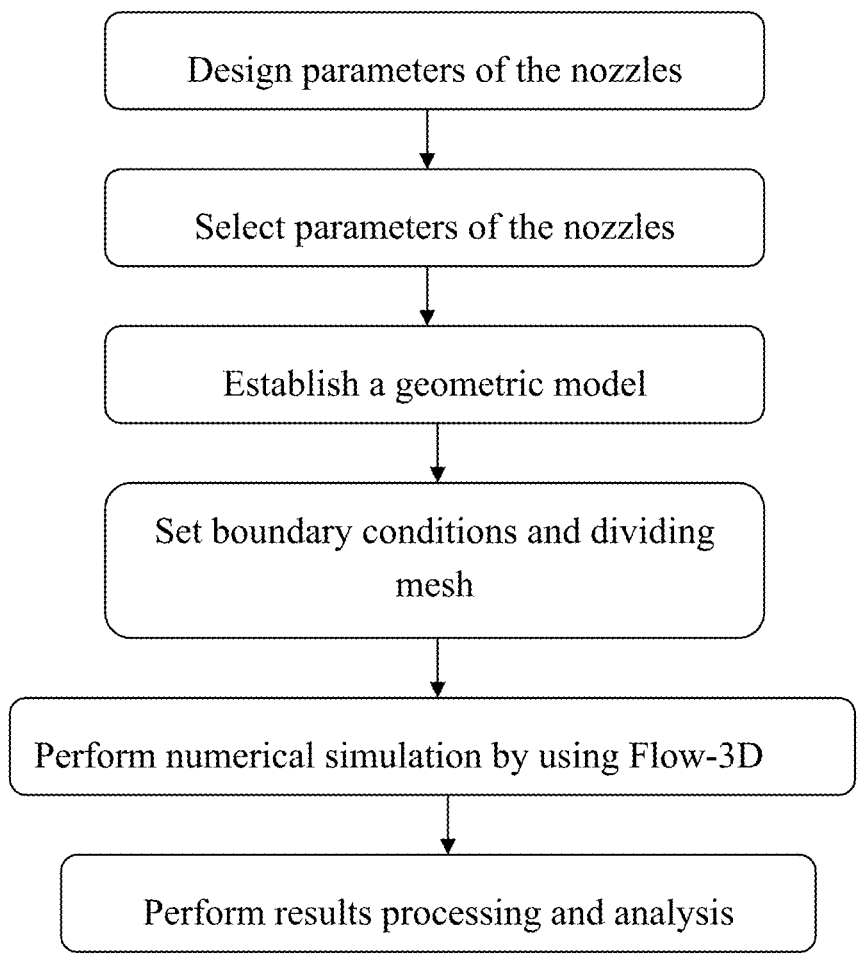
FIG. 1 is a flow diagram of one of the parameter design and numerical simulation of jet trencher nozzle in the embodiment of the present disclosure.
Figure 2:
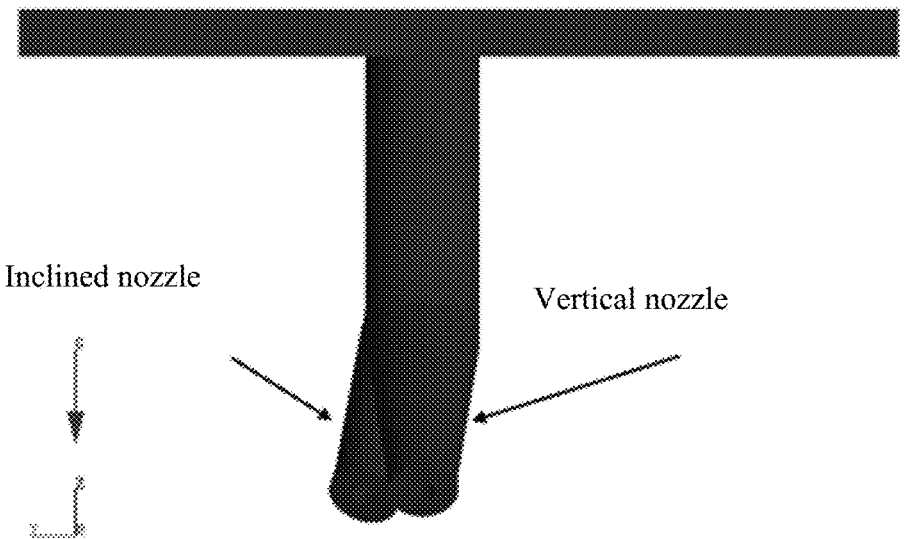
FIG. 2 is a front view of a geometric model for the combination of a vertical nozzle and an inclined nozzle in the embodiment of the present disclosure.
Figure 3:
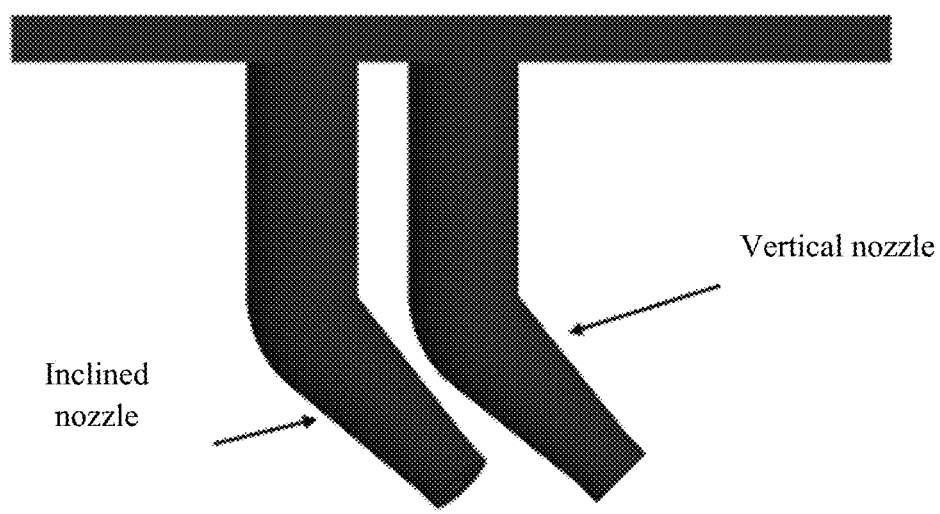
FIG. 3 is a side view of a geometric model for the combination of a vertical nozzle and an inclined nozzle in the embodiment of the present disclosure.

As FIG. 1 shown, a method for parameter design and numerical simulation of jet trencher nozzle, including the following steps:

S1. designing parameters of nozzle
at a distance of x from the nozzle, according to an effective pressure calculation equation of jet flow:

$$\overline{F} = \frac{pR^2}{0.0127x^2},$$

a relation between a nozzle radius and an inclination angle β is derived when the jet flow effective pressures of an inclined nozzle and a vertical nozzle are equal at the same vertical distance:

$$R_i = \frac{1}{\cos\beta} R_v,$$

wherein, R is a radius of the nozzle, p is outlet dynamic pressure of the nozzle, $R_v$ is a radius of the vertical nozzle, and $R_i$ is a radius of the inclined nozzle;

S2. selecting parameters of nozzle
according to the equation of $$R_i = \frac{1}{\cos\beta} R_v$$

derived by step S1, the radius $R_v$ (1 cm in the embodiment) of the vertical nozzle was set as a fixed value, and different inclination angles β were selected of 15°, 30° and 45° respectively in the embodiment, different inclined nozzle radii $R_i$ of 1.04 cm, 1.15 cm and 1.41 cm were obtained respectively;

S3. establishing a geometric model a geometric model was established by combining a vertical nozzle and an inclined nozzle;

according to the nozzle parameters selected in step S2, Solidworks was used to establish a combination geometric model of the vertical nozzle and the inclined nozzle, included: a combination model of a vertical nozzle with a radius of 1 cm and an inclined nozzle with a radius of 1.04 cm and an inclination angle of 15° (as shown in FIG. 2 and FIG. 3), a combination model of a vertical nozzle with a radius of 1 cm and a inclined nozzle with a radius of 1.15 cm and an inclination angle of 30°, a combination model of a vertical nozzle with a radius of 1 cm and an inclined nozzle with a radius of 1.41 cm and an inclination angle of 45°, and the outlets of the vertical nozzle and the inclined nozzle were kept at the same vertical height and the contraction angles of the nozzles were same.

S4. setting boundary conditions and delineating grids
the combination geometric model of the nozzles established in step S3 was imported into Flow-3D software, the computational domain was divided into two blocks connected with each other from top to bottom, the boundaries of the two blocks were defined, and delineated grids on the computational domain and the quality of the grids was checked;

S5. performing numerical simulation by using Flow-3D
a sediment physical model was added and the sediment parameters were defined, an initial condition and time step of the computational domain were set, and the physical timescale and maximum number of iterations were calculated; and,
numerical values were solved in Flow-3D; and S6. performing results processing and analysis
the topographic surface file in Flow-3D calculation results in step S5 was derived, the topographic surface file was processed by Matlab, and the geometric parameters of the flushing trench profile were obtained and analyzed.

Figure 6:
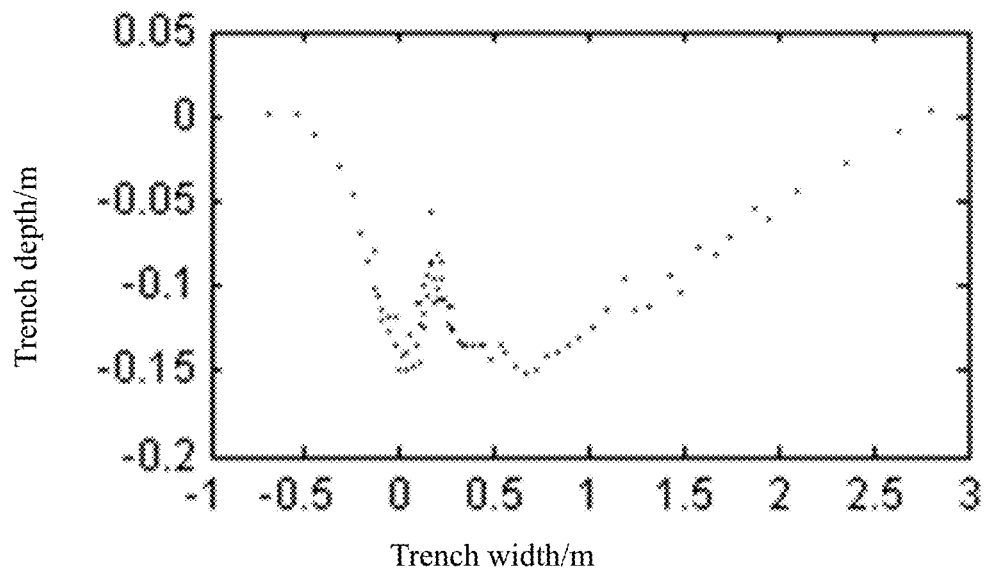
FIG. 6 is a schematic diagram of a flushing trench profile when the radius of the vertical nozzle is 1 cm, the radius of the inclined nozzle is 1.41 cm, and the inclined angle is 45°.
Figure 7:
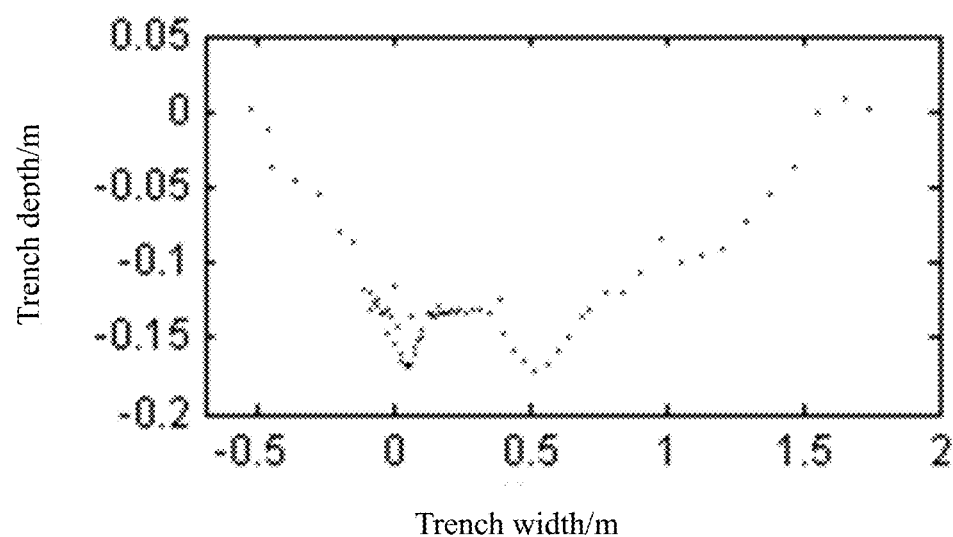
FIG. 7 is a schematic diagram of a flushing trench profile when the radius of the vertical nozzle is 1 cm, the radius of the inclined nozzle is 1.15 cm, and the inclined angle is 30°.
Figure 8:
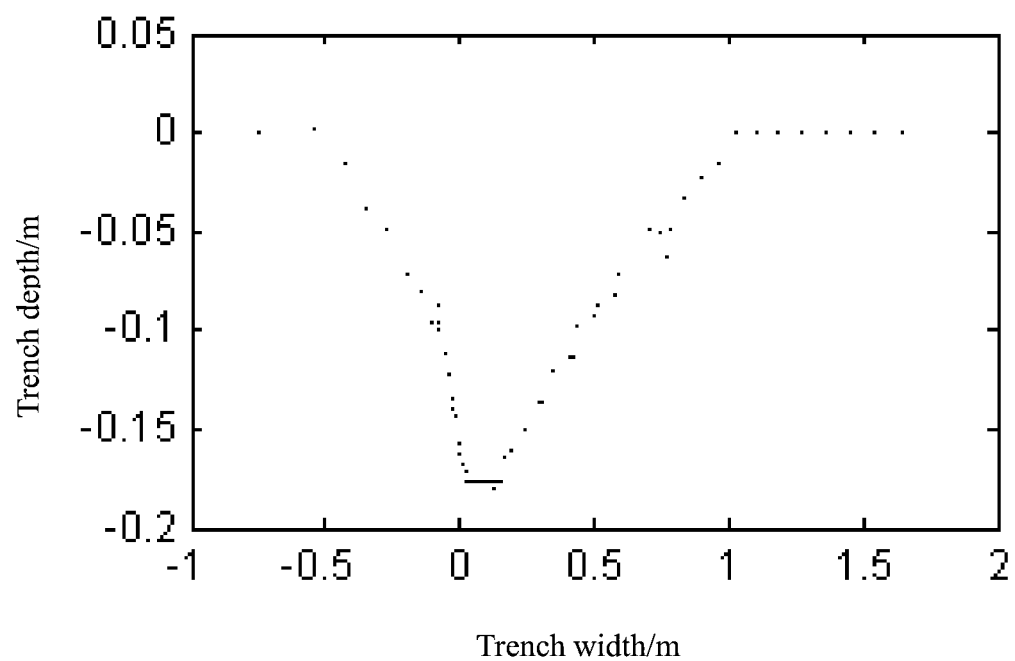
FIG. 8 is a schematic diagram of a flushing trench profile scoured by jet flow when the radius of the vertical nozzle is 1 cm, the radius of the inclined nozzle is 1.04 cm, and the inclined angle is 15°.

The trench-shaped profile flushed out by the combination model of a vertical nozzle with a radius of 1 cm and an inclined nozzle with a radius of 1.41 cm and an inclination angle 45° is shown as FIG. 6; it can be seen that two trench were flushed out by the vertical nozzle and the inclined nozzle and the maximum trench depths of the scouring profile were almost equal, which indicates that the effective impact pressures by the jet flow from the two nozzle outlets acting on the sediment surface are also almost equal, reaching the design purpose of the nozzle radius; the obvious bulge in the middle of the two trenches indicates that the sediment accumulate in the trench and cannot be effectively flushed out, which is not in line with the ideal trench shape of actual operation requirements. The trench-shaped profile flushed out by the combination model of a vertical nozzle with a radius of 1 cm and a inclined nozzle with a radius of 1.15 cm and an inclination angle 30° is shown as FIG. 7; it can be seen that the vertical nozzle and the inclined nozzle flushed out nearly a common trench, the bottom of the trench has a large flat area, and the maximum trench depth of the flushing profile was 0.169 m, which indicates that the effective impact pressures by jet flow from the two nozzle outlets acting on the sediment bed are consistent; most of the sediment in the trench has been flushed out of the trench, and the diameter of the pit is wide, which can meet the requirements of trench shape in some actual seabed trenching work. The trench-shaped profile flushed out by the combination model of a vertical nozzle with a radius of 1 cm and a inclined nozzle with a radius of 1.04 cm and an inclination angle 15° is shown as FIG. 8; it can be seen that the vertical nozzle and the inclined nozzle flushed out the same trench with a maximum trench depth of 0.177 m, which indicates that the effective impact pressures by high pressure flow from the two nozzle outlets acting on the sandy surface are equal, the maximum diameter of the flushing profile is 1.57 m; the bottom area of the trench is flat without bulges, indicating that the sediment in the trench has been flushed out completely. It can be seen from the figures that the maximum trench depths flushed out by the vertical nozzle and the inclined nozzle are equal, which proves that the flow jet at the outlets of two nozzles (satisfying the relation of $$R_i = \frac{1}{\cos\beta} R_v$$

can reach the same effectively impact pressure at the same vertical height, showing that the design method is reasonable and feasible. When the nozzle length and the target distance are fixed, the possibility of two trenches will be flushed out with the increase of inclined angle of the nozzle is analyzed qualitatively.

In step S1, due to the out lets of the inclined nozzle and the vertical nozzle at the same vertical heights, the target distance $x_i$ of the inclined nozzle is $$\frac{1}{\cos\beta}$$

times of the striking distance $x_v$, that is $$x_i = \frac{1}{\cos\beta} x_v,$$

which is plugged into the jet flow effective pressure calculation equation; in order to use the same outlet dynamic pressure to make the inclined nozzle and vertical nozzle reach the same jet flow effective pressure at a same vertical distance, an equation is derived as:

$$R_i = \frac{1}{\cos\beta} R_v.$$

Figure 4:
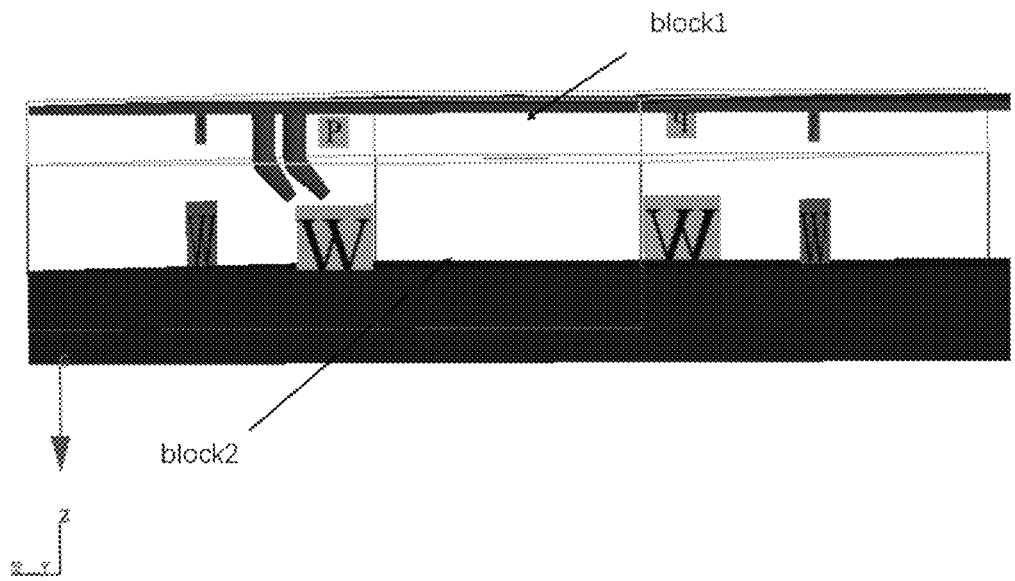
FIG. 4 is a schematic diagram of the delineation and boundary conditions of the computational domain block in the embodiment of the present disclosure; wherein, P represents pressure boundary, and W represents wall boundary.

As shown in FIG. 4, in step S4, the boundaries around the upper block were defined as $X_{Max}$, $X_{Min}$, $Y_{Max}$ and $Y_{Min}$, all of which were set as pressure outlet boundaries with a pressure value of 0, $Z_{Max}$ of the upper block was set as the pressure inlet boundary with a pressure value as a nozzle inlet pressure.

Due to $Z_{min}$ of the upper block was connected to $Z_{max}$ of the lower block, $Z_{min}$ of the upper block was set as default boundary, so that the software will automatically connect to the $Z_{Max}$ of the block during initialization.

The four boundaries of the lower block were defined as $X'_{Max}$, $X'_{Min}$, $Y'_{Max}$ and $Y'_{Min}$, all of which were set as wall boundaries; due to $Z'_{Min}$ of the lower block is sediment, $Z'_{Min}$ was also set as wall boundary, and $Z'_{Max}$ of the lower block was set as default boundary, which was connected with the $Z_{Min}$ boundary of the upper block.

Figure 5:
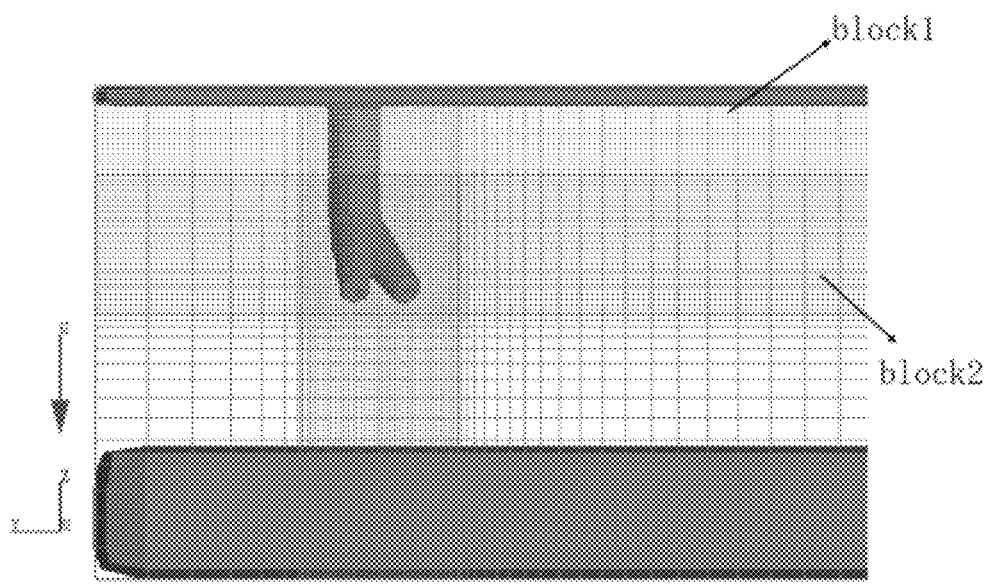
FIG. 5 is a schematic diagram of grid delineation of the computational domain in the embodiment of the present disclosure.

As shown in FIG. 5, increasing the density of grids of the nozzles in two blocks and the grids in three directions of the flushing area, the grids of the remaining area was set sparsely, so as to control the grid quantity reasonably.

In step S5, a sediment volume fraction was calculated by tracking a sediment concentration $C_s$ of the suspended sediment and a sediment concentration $C_p$ of the bed load using the sediment physical model; a total sediment volume fraction $\alpha_s$ was total volume fraction of suspended sediment and bed load in the grid, with an equation:

$$\alpha_s = \frac{C_s + C_p}{\rho_s} = 1 - \alpha_f$$

wherein, $\alpha_f$ is a volume fraction of the fluid in a grid, $\rho_s$ is a sediment particle density, an expression for the volume fraction of the bed load is $\alpha_{s,p} = C_p/\rho_s$, an expression for the volume fraction of the suspended sediment is $\alpha_{s,s} = C_s/\rho_s$, a critical sediment volume fraction is $\alpha_{cr}$, and the total volume fraction $\alpha_s$ is smaller or equal to the critical sediment volume fraction $\alpha_{cr}$, the parameters need to be defined in the sediment physical model are: a median particle size with the unit of m, a sediment density with the unit of kg/m$^3$, an entrainment coefficient $\alpha_i$, a bed load coefficient $\beta_i$, a angle of repose with the unit of °, and a critical sediment volume fraction; and the RNGk-ε model, which is applicable to calculate local flushing caused by water flow, was used in the Flow-3D as a turbulence model:

$$\rho\frac{Dk}{Dt} = \frac{\partial}{\partial y}\left(\alpha_k \mu_{eff} \frac{\partial k}{\partial y}\right) + G_k + G_b - \rho\varepsilon - Y_M$$

$$\rho\frac{D\varepsilon}{Dt} = \frac{\partial}{\partial y}\left(\alpha_\varepsilon \mu_{eff} \frac{\partial \varepsilon}{\partial y}\right) + C_{1\varepsilon}\frac{\varepsilon}{k}(G_k + C_{3\varepsilon}G_b) - C_{2\varepsilon}\rho\frac{\varepsilon^2}{k} - R$$

wherein, $\rho$ is a fluid density, t is time, k is a turbulent kinetic energy, ε is a turbulent dissipation rate; $\alpha_k$ and $\alpha_\varepsilon$ are inverses of the turbulent Prandtl number; $\mu_{eff}$ and R are corrected parameters; $G_k$ and $G_b$ are respectively laminar velocity gradient and turbulent kinetic energy caused by buoyancy; $Y_M$ is turbulent expansion contribution of compressible fluid; $C_{1\varepsilon}$, $C_{2\varepsilon}$ and $C_{3\varepsilon}$ are empirical constants.

In step S6, the topographic surface file of the Flow-3D calculation results in step S5 was derived, the topographic surface file by Matlab was processed, and the geometric parameters of the trench profile flushed by jet flow was obtained and the trench profile flushed by jet flow was drawn.

The parameter of maximum trench depth was analyzed to verify that the effective pressures acting on the sediment surface at the same vertical distance of the inclined nozzle and vertical nozzle are equal.

The influence rule of nozzle angle size on the trench profile was summarized by analyzing the geometrical shape of the trench profile flushed by jet flow.

Finally, it should be stated that the above embodiments are only used to illustrate the technical solutions of the present disclosure without limitation; and despite reference to the aforementioned embodiments to make a detailed description of the present disclosure, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A method for parameter design and numerical simulation of a jet trencher nozzle, comprising the following steps:

Step S1, designing parameters of nozzle, wherein:
at a distance of x from the jet trencher nozzle, according to an effective pressure calculation equation of jet flow:

$$F = \frac{pR^2}{0.0127x^2},$$

denying a relation between a nozzle radius and an inclination angle of β when the effective pressures of jet flow of an inclined nozzle and a vertical nozzle are equal at a same vertical distance:

$$R_i = \frac{1}{\cos\beta} R_v,$$

R being a radius of the jet trencher nozzle, p being an outlet dynamic pressure of the jet trencher nozzle, $R_v$ being a radius of the vertical nozzle, $R_i$ being a radius of the inclined nozzle;

Step S2, selecting parameters of the nozzle, wherein:
according to the equation $$R_i = \frac{1}{\cos\beta} R_v$$

derived in Step S1, taking the radius $R_v$ of the vertical nozzle as a fixed value, and selecting different inclination angles β to obtain different radii $R_i$ of inclined nozzles;

Step S3, establishing a geometric model, wherein:
according to the nozzle parameters selected in Step S2, establishing a combination geometric model of the vertical nozzle and the inclined nozzle;

Step S4, setting boundary conditions and delineating grids, wherein:
importing the combination geometric model established in Step S3 into a software program, dividing a computational domain into an upper block and a lower block connected with each other from top to bottom, defining boundaries of the upper block and the lower block, and delineating grids on the computational domain and checking the quality of the grids;

Step S5, performing numerical simulation, comprising:
adding a sediment physical model and defining the sediment parameters, setting an initial condition, time step of the computational domain, a physical time and a maximum number of iterations;
solving numerical values; and Step S6, performing results processing and analysis deriving a topographic surface file based on simulation results obtained in Step S5, processing the topographic surface file to obtain and analyze the geometric parameters of a flushing trench profile.

2. The method according to claim 1, wherein in Step S1, when outlets of the inclined nozzle and the vertical nozzle at the same vertical distance, the target distance $x_i$ of the inclined nozzle is $$\frac{1}{\cos\beta}$$

times of a strike distance $x_v$ of the vertical nozzle, that is $$x_i = \frac{1}{\cos\beta} x_v,$$

when the inclined nozzle and the vertical nozzle reach the same jet flow effective pressure at the same vertical distance, $$R_i = \frac{1}{\cos\beta} R_v.$$

3. The method according to claim 1, wherein Step S4 comprises:
defining the boundaries around the upper block as $X_{Max}$, $X_{Min}$, $Y_{Max}$, and $Y_{Min}$, which are set as pressure outlet boundaries with a pressure value of 0;
setting $Z_{Max}$ of the upper block as a pressure inlet boundary with a pressure value as a nozzle inlet pressure;
setting $Z_{min}$ of the upper block as a default boundary, $Z_{min}$ of the upper block being connected to $Z_{max}$ of the lower block;
defining the four boundaries of the lower block as $X'_{Max}$, $X'_{Min}$, $Y'_{Max}$, and $Y'_{Min}$, which are set as wall boundaries;
setting $Z'_{Min}$ of the lower block as a wall boundary, $Z'_{Min}$ of the lower block being sediment; and
setting $Z'_{Max}$ of the lower block as a default boundary, which is connected with the $Z_{Min}$ boundary of the upper block.

4. The method according to claim 1, wherein Step S5 comprises:
calculating a sediment volume fraction by tracking a sediment concentration $C_s$ of the suspended sediment and a sediment concentration $C_p$ of a bed load using the sediment physical model;
a total sediment volume fraction $\alpha_s$ is the total volume fraction of suspended sediment and bed load in the grid, with an equation:

$$\alpha_s = \frac{C_s + C_p}{\rho_s} = 1 - \alpha_f,$$

wherein $\alpha_f$ of is a volume fraction of the fluid in a grid, $\rho_s$ is a sediment particle density, an expression for a volume fraction of the bed load is $\alpha_{s,p} = C_p/\rho_s$, an expression for a volume fraction of suspended sediment is $\alpha_{s,s} = C_s/\rho_s$, a critical sediment volume fraction is $\alpha_{cr}$, and the total volume fraction $\alpha_s$ is smaller or equal to the critical sediment volume fraction $\alpha_{cr}$; the parameters need to be defined in the sediment physical model are: median particle size with the unit of m, sediment density with the unit of kg/m³, entrainment coefficient $\alpha_i$, bed load coefficient $\beta_i$, angle of repose with the unit of °, and critical sediment volume fraction; and
using a turbulence model:

$$\rho \frac{Dk}{Dt} = \frac{\partial}{\partial y}\left(\alpha_k \mu_{eff} \frac{\partial k}{\partial y}\right) + G_k + G_b - \rho\varepsilon - Y_M,$$

-continued
$$\rho \frac{D\varepsilon}{Dt} = \frac{\partial}{\partial y}\left(\alpha_\varepsilon \mu_{eff} \frac{\partial \varepsilon}{\partial y}\right) + C_{1\varepsilon}\frac{\varepsilon}{k}(G_k + C_{3\varepsilon}G_b) - C_{2\varepsilon}\rho \frac{\varepsilon^2}{k} - R,$$

wherein $\rho$ is fluid density, t is time, k is turbulent kinetic energy, $\varepsilon$ is turbulent dissipation rate; $\alpha_k$ and $\alpha_\varepsilon$ are inverses of the turbulent Prandtl number; $\mu_{eff}$, and R are corrected parameters, $G_k$ and $G_b$ are respectively laminar velocity gradient and turbulent kinetic energy caused by buoyancy, $Y_M$ is turbulent expansion contribution of compressible fluid, and $C_{1\varepsilon}$, $C_{2\varepsilon}$ and $C_{3\varepsilon}$ are empirical constants.

5. The method according to claim 1, wherein Step S6 further comprises:
verifying that the effective pressures acting on the sediment surface at the same vertical distance of the inclined nozzle and vertical nozzle are equal by analyzing a parameter of maximum trench depth; and
summarizing an influence rule of nozzle angle size on the trench profile by analyzing a geometrical shape of the flushing trench profile.

\* \* \* \* \*